United States Patent [19]

Crook et al.

[11] Patent Number: 5,075,604

[45] Date of Patent: Dec. 24, 1991

[54] VARIABLE RESISTANCE SWITCH

[75] Inventors: Fred L. Crook; Gary D. Meyer, both of Waukesha; Greg J. Topel, Hartland, all of Wis.

[73] Assignee: Milwaukee Electric Tool Corporation, Brookfield, Wis.

[21] Appl. No.: 558,696

[22] Filed: Jul. 27, 1990

[51] Int. Cl.$^5$ .............................................. H02P 7/28

[52] U.S. Cl. ...................................... 318/17; 388/840; 388/807; 200/522; 200/537; 338/198; 338/200

[58] Field of Search ............... 318/774, 793, 786, 289, 318/17; 388/807, 919, 840; 338/191, 172, 198, 200; 200/43.01, 51.03, 537, 522

[56] References Cited

U.S. PATENT DOCUMENTS

| | | | |
|---|---|---|---|
| 3,336,456 | 8/1967 | Julian et al. | 200/168 |
| 3,536,973 | 2/1968 | Matthews et al. | 318/345 |
| 3,740,632 | 6/1973 | Whitney et al. | 318/289 |
| 3,745,286 | 7/1973 | Sahrbacker | 200/157 |
| 3,769,481 | 10/1973 | Raab | 200/161 |
| 3,777,092 | 12/1973 | Yeske | 200/172 |
| 3,869,590 | 3/1975 | Hults | 200/157 |
| 3,898,402 | 8/1975 | Ford | 200/67 |
| 4,061,895 | 12/1977 | Hults | 200/157 |
| 4,100,383 | 7/1978 | Piber | 200/157 |
| 4,103,127 | 7/1978 | Hults et al. | 200/67 |
| 4,149,053 | 4/1979 | Long | 200/157 |
| 4,220,944 | 9/1980 | Pudelko et al. | 338/176 |
| 4,237,442 | 12/1980 | Carter | 338/180 |
| 4,241,297 | 12/1980 | Piber et al. | 318/17 |
| 4,286,125 | 8/1981 | Schaffeler et al. | 200/6 B |
| 4,322,711 | 3/1982 | Spangler et al. | 338/198 |
| 4,435,691 | 3/1984 | Ginn | 338/125 |
| 4,443,749 | 4/1984 | Douthart et al. | 318/774 |
| 4,572,997 | 2/1986 | Yamanobe et al. | 318/17 |
| 4,618,747 | 10/1986 | Schaffeler | 200/67 |
| 4,638,226 | 1/1987 | Damiano et al. | 318/345 H |
| 4,654,626 | 3/1987 | Carsello | 338/172 |
| 4,665,290 | 5/1987 | Piber | 200/303 |
| 4,703,248 | 10/1987 | Kühnemundt et al. | 318/345 H |
| 4,712,079 | 12/1987 | Marquardt | 335/132 |
| 4,724,286 | 2/1988 | Cummins | 338/200 |
| 4,751,492 | 6/1988 | Tsuzuki et al. | 338/176 |
| 4,754,110 | 6/1988 | Craft | 200/302.2 |
| 4,771,263 | 9/1988 | Crook et al. | 338/176 |

FOREIGN PATENT DOCUMENTS

| | | |
|---|---|---|
| 947889 | 1/1964 | United Kingdom . |
| 968213 | 9/1964 | United Kingdom . |

*Primary Examiner*—Stanley J. Witkowski
*Assistant Examiner*—John W. Cabeca
*Attorney, Agent, or Firm*—Michael, Best & Friedrich

[57] ABSTRACT

A variable resistance switch includes first and second flexible contact arms engageable by a pair of cam followers operable sequentially by an actuator movable in a first and an opposite direction. The actuator also carries a wiper movable therewith over a variable resistance coupled to a terminal. The first contact arm is operable upon initial movement of the actuator in a first direction to complete a first circuit through the switch, and the second switch arm is operable upon further movement of the actuator in the first direction to complete a second circuit through the switch and to place the variable resistance in circuit between one of the switch arms and the terminal. Further movement of the actuator in the first direction is operable to move a wiper over the resistance to vary the resistance in circuit with the terminal. A pivotal trigger is coupled to the actuator for moving the same in the first direction, and a spring biases the cam in the opposite direction.

21 Claims, 2 Drawing Sheets

VARIABLE RESISTANCE SWITCH

BACKGROUND OF THE INVENTION

This invention relates to switches, and more particularly to variable resistance switches for controlling the speed of electric motors.

Portable tools having variable speed motors generally include switches for completing a motor energizing circuit and means for controlling the flow of energy to the motor. It is desirable to provide such tools with operating means for completing the energizing circuit and controlling the motor speed through the application of a continuous constant force.

SUMMARY OF THE INVENTION

It is an object of the invention to provide a new and improved switch for energizing and controlling small motors.

Another object of the invention is to provide a switch for energizing and controlling a small motor wherein the operating sequence is accomplished by the application of a continuous, constant force.

A further object of the invention is to provide a switch for small motors wherein operation is initiated by the sequential closure of contacts and wherein resistance in the motor control circuit is varied thereafter.

In general terms, the invention comprises a switch including first and second switch means, actuator means operable in a first direction for sequentially closing the first and second switch means, respectively, and biasing means engaging the actuator means for urging the actuator means for movement in the opposite direction for opening the first and second switch means. Resistance means is disposed adjacent to one of the switch means and is connected to a terminal means. The actuator means electrically couples the resistance means to one of the switch means wherein the actuator means is operative to vary the resistance between the one switch means and the terminal upon movement of the actuator means in the first direction and for increasing the resistance thereof upon return movement in the opposite direction.

The invention also comprises the combination of a motor, a variable speed control and a switch for connecting the motor to a source of electrical energy. The switch includes first and second pairs of terminals, one terminal of each pair being adapted to be connected to the source of electrical energy. First and second switch means are connected in circuit between the terminals of each pair of terminals, respectively, and the motor is connected to the second terminal of the first pair of terminals. Control means is connected between the motor and the second terminal of the other pair of terminals. Actuator means is operable in a first direction for sequentially closing the first and second switch means, respectively, and biasing means engages the actuator means for urging the actuator means for movement in the opposite direction for opening the first and second switch means. Resistance means is disposed adjacent to one of the switch means and is connected to additional terminal means which couples the resistance means to the control means. The actuator means electrically couples the resistance means to one of the switch means and is operative to vary the resistance between the one switch means and the terminal means upon movement of the actuator means in the first direction and for increasing the resistance thereof upon return movement in the opposite direction whereby the resistance between the switch means and the control means is varied for varying the speed of the motor when the switch means are closed.

DETAILED DESCRIPTION OF THE PREFERRED EMBODIMENT

Figure 1:
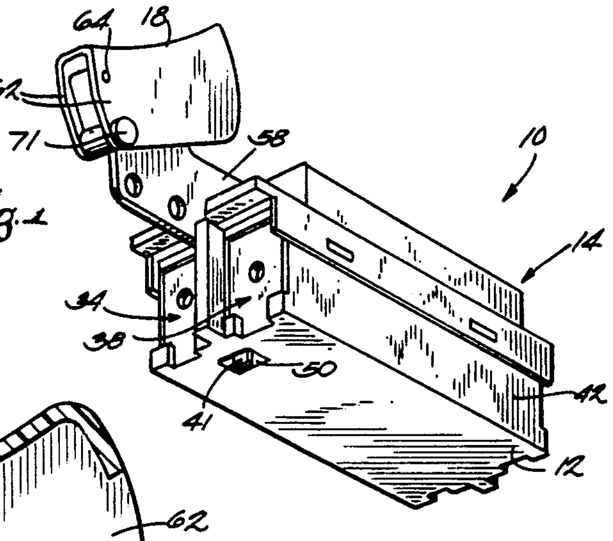
FIG. 1 is a perspective view of the switch according to the invention.

The switch 10, according to the preferred embodiment of the invention, includes a housing 12 and a cover 14. Disposed within housing 12 and beneath cover 14 is an actuator 16 which is movable longitudinally within housing 12 under the influence of a trigger 18 and a return spring 20. Also disposed within housing 12 are a pair of spring contact arms 22 and 24 and a pair of stationary contacts 26 and 28. The actuator 16 carries a conductive wiper 30 which is movable over a resistance strip 32 mounted on the inner bottom surface of the housing 12. As will be discussed more fully hereinbelow, movement of the actuator a first incremental distance under the influence of the trigger 18 will move the first switch arm 24 into engagement with contact 28 to complete a circuit between terminals 38 and 40. Further movement of the actuator will move the second switch arm 22 into engagement with contact 26 thereby completing the circuit between a second pair of terminals 34 and 36. Additional movement of actuator 16 will move wiper 30 over resistance strip 32 to vary the resistance in circuit between terminal 34 and a fifth terminal 41. As those skilled in the art will appreciate, the housing 12, the cover 14 and the actuator 16 may be formed of any suitable nonconductive material. For example, the housing 12 and the cover 14 may be formed of a polycarbonate and the actuator 16 of a nonconductive plastic.

The housing 12 is generally rectangular in plan view and has a pair of side walls 42 and a center section 43 which includes a pair of end barriers 44 and 46 which extend upwardly between the terminals 34, 38 and 36, 40, respectively, for providing electrical insulation. In addition, there is a lower guide wall 48 extending longitudinally through housing 12 and adjacent the resistance strip 32 for isolating the same from the terminals 38 and 40 and for providing a guide for the actuator 16. The terminal 41, has an inverted U-shape and is suitably mounted at one end of housing 12 with one leg engaging an end of resistor strip 32 and a second end extending into a recess 50 formed in the base of housing 12 for receiving a conductor clip (not shown).

The cover 14 is generally coextensive with the housing 12 and includes a top wall 54 and a pair of downwardly extending side walls 56 which embrace the side walls 42 of housing 12 and are fixed thereto in any suitable manner. A trigger support and guide 58 is formed integrally at and extends forwardly from one end of cover 14. Guide 58 is elongate and has an inverted U-shape in vertical section. A trigger support 60 is provided at the front end of guide 58 and extends generally upwardly therefrom. The trigger 18 also has an inverted U-shape in transverse section and includes sides 62 which extend downwardly along the opposite sides of guide 58. A pair of pivots 64 extend laterally from support 60 and through complementary openings in the sides 62 of trigger 18.

The actuator 16 includes a body portion 66 and a stem 68 extending forwardly therefrom and through an opening 70 in the front of cover 14. The stem 68 also extends in parallelism with guide 58 and between its opposite sides. The free end of stem 68 is enlarged for receiving a transverse pin 71 which also extends through aligned openings in the lower ends of the sides 62 of trigger 18. A suitable seal, such as a felt gasket 72, may be provided around the stem 68 and is received in grooves 73 and 74 in the housing portion 44 and the guide 58, respectively, for inhibiting the entry of foreign material into housing 12. In addition, a suitable seal, such as a felt gasket 75, may also be provided between the housing 12 and the cover 14.

An elongate recess 76 is formed in the upper end of the body portion 66 for receiving a return spring 20. It can be seen in FIG. 2 that one end of spring 20 bears against the end of recess 76 and the other end abuts against a projection 78 extending downwardly from cover 14. A second guide 80 extends downwardly from the lower end of actuator 16 and bears against the guide wall 48 whereby the actuator is guided for longitudinal movement within housing 12 under the influence of the trigger 18 and the return spring 20.

The terminals 34, 36, 38 and 40 each include first portions 34.1, 36.1, 38.1 and 40.1, respectively, having a generally inverted U-shape located generally at the corners of housing 12 and a planer strip 34.2, 36.2, 38.2 and 40.2, respectively, which extends along the inner bottom surface of housing 12. Partitions 82 separate the adjacent ends of terminal portions 34.2–36.2 and 38.2–40.2. Flexible contact arms 22 and 24 are connected respectively to terminals 36 and 38 and the stationary contacts 26 and 28 are respectively connected to terminals 34 and 40.

Figure 2:
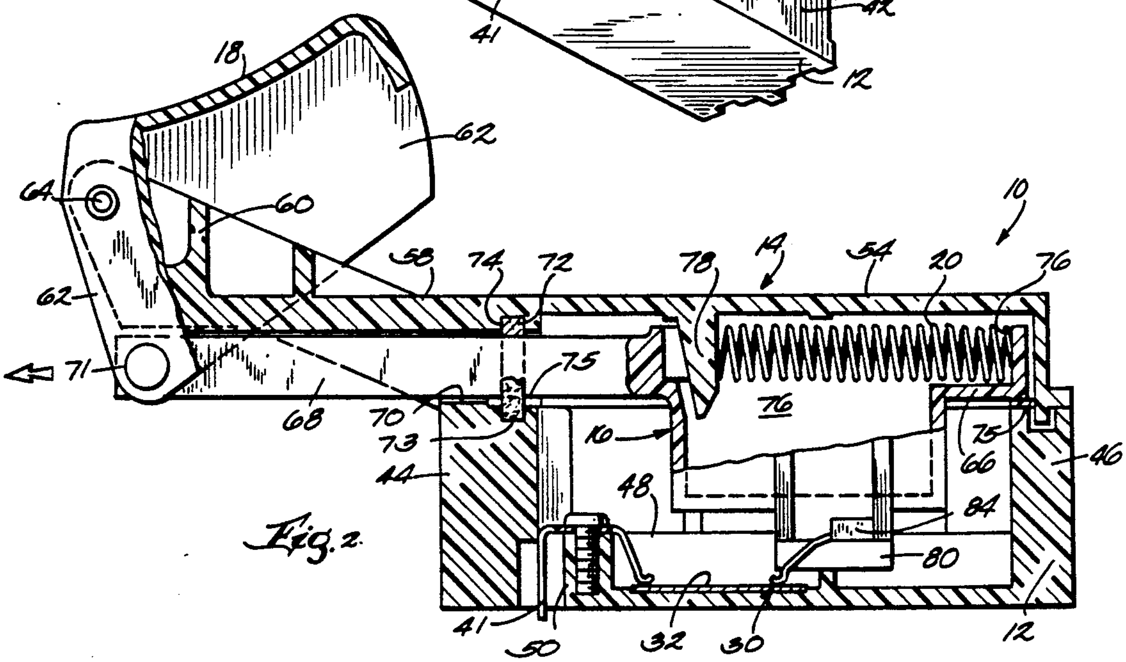
FIG. 2 is a side sectional view, with parts broken away of the switch of FIG. 1.
Figure 6:
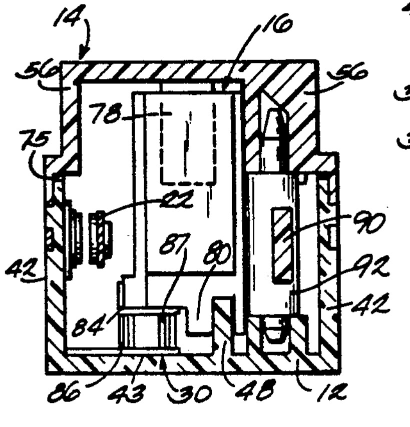
FIG. 6 is a view taken along lines 6—6 of FIG. 4.
Figure 3:
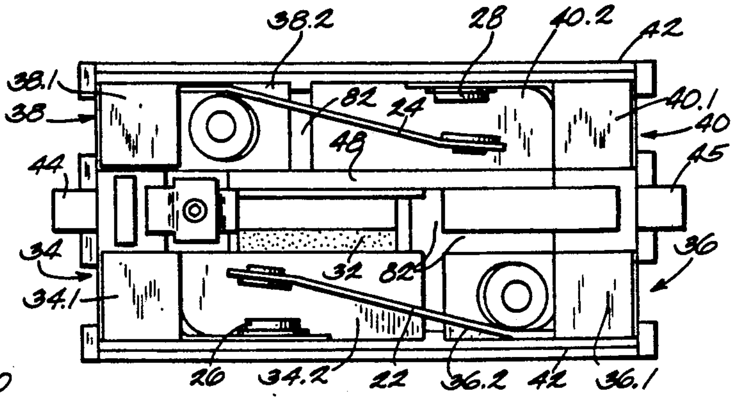
FIG. 3 is a top view, with parts broken away of the switch of FIG. 1.
Figure 5:
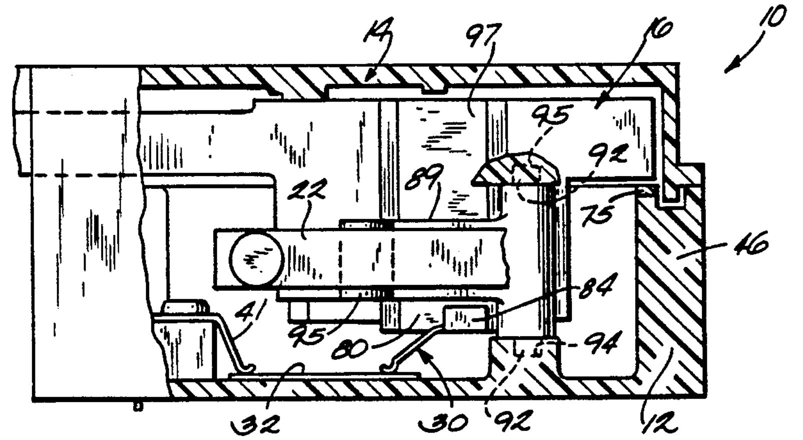
FIG. 5 is a view taken along lines 5—5 of FIG. 4.

As seen in FIGS. 2 and 3, the resistance strip 32 is applied to the surface of the housing 12 adjacent to and in general parallelism with the terminal portion 34.2. However, the two are electrically isolated except for the wiper 30 as will be discussed below. While any well-known resistance strip material may be employed, one such material is disclosed in U.S. Pat. No. 4,771,263, issued Sept. 13, 1988, and which is hereby incorporated by reference.

Figure 7:
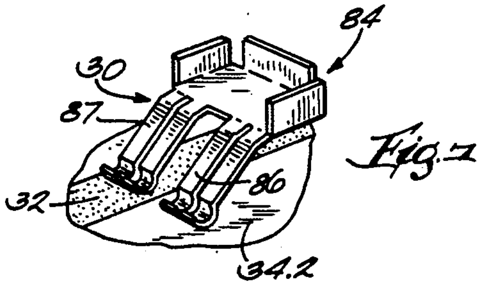
FIG. 7 is a fragmentary perspective view of a portion of the switch shown in FIG. 1.

The wiper 30 is formed of a suitable conductive material, such as copper, and includes a clip portion 84 for attachment to the lower end of actuator 16. As shown in FIG. 7, a first pair of fingers 86 extend downwardly from the clip 84 and engage contact 34.2, and a second pair of fingers 87 extend downwardly therefrom and engage resistance strip 32. It can be seen that depending upon the position of the actuator 16, a portion of the resistance strip is placed in circuit between terminals 34 and 41.

Disposed adjacent the opposite sides of the actuator 16 is a pair of pivot arms 89 and 90, each having a pair of trunions 92 extending laterally from each of its opposite sides and adjacent one end. The trunions 92 of pivot arm 89 are received in suitable aligned, vertically spaced apart pivot openings 94 and 95 in the housing 12 and the cover 14, respectively, and adjacent terminal 36. The trunions 92 of pivot arm 90 are received in similar openings adjacent the terminal 38. The pivot arms 89 and 90 each have a generally cylindrical follower 94 and 95, respectively, mounted at their free ends for engaging the opposite side surfaces of the actuator 16.

Figure 4:
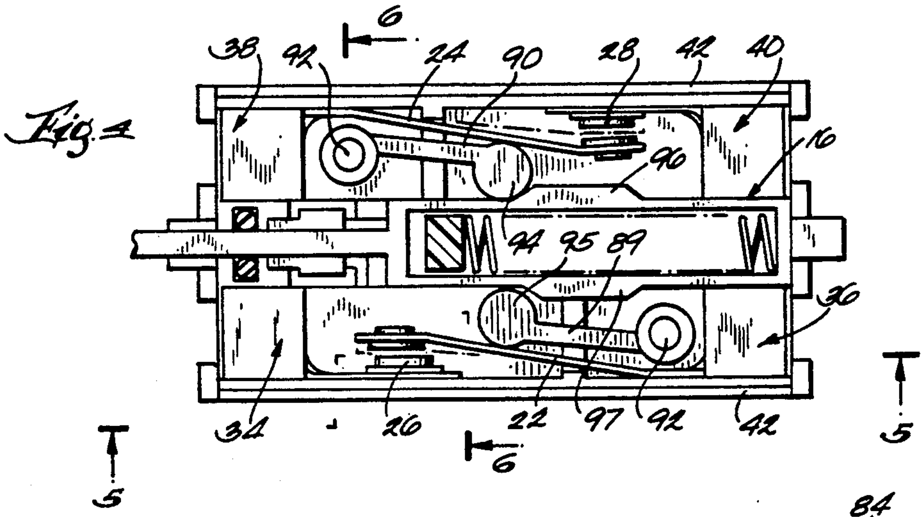
FIG. 4 is a bottom view, with parts broken away of the switch of FIG. 1.

As seen in FIG. 4, the actuator 16 has a pair of cams 96 and 97, one being formed on each of the lateral sides and positioned adjacent the points of engagement of the followers 94 and 95. It can also be seen in FIG. 4 that the follower 94 is positioned adjacent cam 96 while the follower 95 of pivot arm 94 is spaced slightly from cam 97.

When the trigger 18 is pivoted clockwise as viewed in FIG. 1 and about pivots 64, the pin 72 will be translated to the left, thereby also moving the actuator 16 to the left as viewed in FIGS. 1 and 4 and against the biasing force of the return spring 20. Because the follower 94 of pivot arm 90 engages the inclined portion of cam 96, the initial movement of the actuator 16 toward the left in FIG. 4 will cause the pivot arm 90 to pivot counterclockwise as seen in FIG. 4, thereby moving the follower 94 into engagement with the spring contact arm 24 and forcing the same into engagement with the stationary contact 28. However, because of the space between the inclined surface of cam 97 and follower 95 on pivot arm 89, the latter is unaffected during the initial movement of actuator 16. Further movement of the actuator will, however, cause the follower 95 to be displaced by the cam 97 and against the resilient contact arm 22, thereby moving the latter into engagement with the stationary contact 26.

The closing of contact arm 24 and contact 28 completes the circuit between terminals 38 and 40, and the closing of contact arm 22 and contact 26 completes the circuit between terminals 34 and 36. In addition, movement of the actuator under the influence of trigger 18 will move wiper 30 over the resistance 32 and the terminal portion 34.2, thereby decreasing the resistance between terminals 34 and 41. Release of the trigger 18 will permit the actuator 16 to be returned to its initial position under the influence of spring 20. As a result, the contact arms 22 and 24 will return to their open positions. Because the spring 20 is compressed along its axis, the force required to close the contact arms 22 and 24 and move the wiper 30 over resistance 32 will remain substantially constant throughout the operating sequence.

Figure 8:
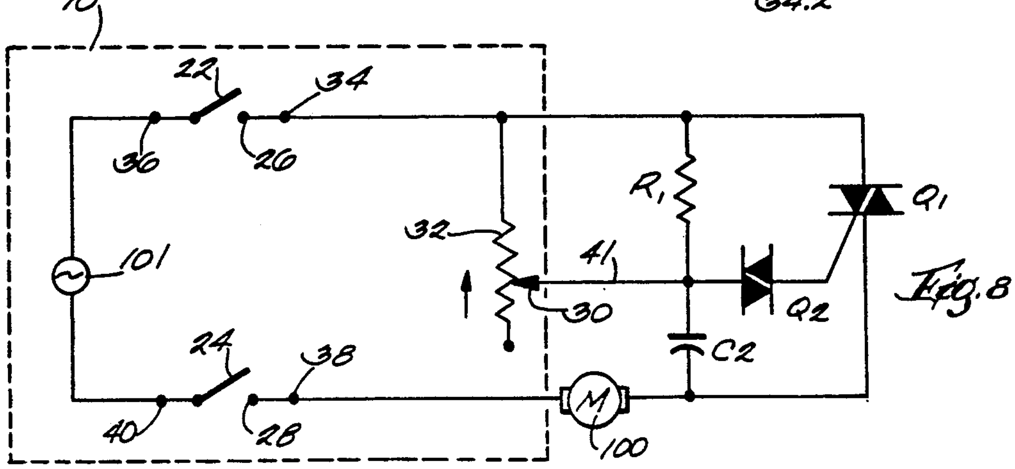
FIG. 8 schematically illustrates the application of the switch shown in FIG. 1 to a motor energizing circuit.

FIG. 8 schematically illustrates how the switch 10 in accordance with the preferred embodiment of the invention is connected to a motor 100. It can also be seen that the circuit between the motor 100 and a power source 101 includes a triac Q1. The gate of triac Q1 is connected by a diac Q2 to the junction between a resistor R1, a capacitor C2 and terminal 41. When actuator 16 is moved by trigger 18, contact arm 24 will close first, and thereafter contact arm 22 will close. This provides a gate signal to triac Q1 which becomes conductive so that motor operation commences. As wiper 30 is moved by actuator 16 in the direction of the arrow, the rate of increase in voltage at terminal 41 will fire the diac Q2 and triac Q1 sooner, thereby increasing the flow of current to motor 100. This will increase motor speed in the manner well known in the art.

While only a single embodiment of the invention has been illustrated and described, it is not intended to be limited thereby, but only by the scope of the appended claims.

We claim:

1. A switch includes first and second switch means,
actuator means operable in a first direction for closing said first and second switch means in sequence so that said first switch means closes prior to the closing of the second switch means,
biasing means engaging said actuator means for urging said actuator means for movement in the opposite direction for opening said first and second switch means,
resistance means disposed adjacent one of said switch means, terminal means in circuit with said resistance means,
said actuator means electrically coupling said resistance means to one of said switch means and being operative to vary the resistance between said switch means and said terminal means upon movement of said actuator means in said first direction and for increasing the resistance thereof upon return movement in the opposite direction.

2. The switch set forth in claim 1 wherein said first and second switch means each comprise moveable first and second contact arm means and first and second stationary contact means, said actuator means sequentially engaging said contact arm means for closing said switch means in sequence and for sequentially disengaging said contact arm means for sequentially opening said first and second switch means.

3. The switch set forth in claim 2 and including a second terminal means in circuit with one of said stationary contact means, said resistance means comprising a strip of resistive material disposed adjacent said second terminal means and extending in the first direction, and conductive wiper means mounted on said actuator means and engaging said second terminal means and said resistance strip for providing an electrical connection therebetween so that said resistance strip is in circuit between said first and second terminal means, movement of said actuator means in said first direction being operative to move said wiper along said resistance strip and reduce the resistance between said first and second terminal means.

4. The switch set forth in claim 1 and including housing means having opposite sides, each of said switch means comprises a resilient contact arm with each being fixed adjacent one end to a different side of said housing means, said switch means also including stationary contact means adjacent the free end of each contact arm and generally perpendicular to the first direction, first and second pivot arms disposed respectively adjacent one of said contact arms and including follower means at its free end disposed between the free end of the adjacent contact arm and the actuator means, movement of said actuator means being operative to sequentially engage said contact arms and thereby move said contact arms into engagement with its stationary contact means.

5. The switch set forth in claim 1 and including trigger means pivotally mounted on the housing means and coupled to the actuator means, pivotal movement of said trigger means in one direction being operative to move said actuator means in its first direction.

6. The switch set forth in claim 3 and including trigger means pivotally mounted on the housing and coupled to the actuator means, pivotal movement of said trigger means in one direction being operative to move said actuator means in its first direction.

7. A switch includes first and second switch means,
actuator means operable in a first direction for sequentially closing said first and second switch means, respectively,
biasing means engaging said actuator means for urging said actuator means for movement in the opposite direction for opening said first and second switch means,
resistance means disposed adjacent one of said switch means, terminal means in circuit with said resistance means,
said actuator means electrically coupling said resistance means to one of said switch means and being operative to vary the resistance between said switch means and said terminal means upon movement of said actuator means in said first direction and for increasing the resistance thereof upon return movement in the opposite direction,
said first and second switch means each comprise moveable first and second contact arm means and first and second stationary contact means, said actuator means sequentially engaging said contact arm means for closing said switch means in sequent,
housing means having opposite sides, said first and second switch means being disposed adjacent the opposite sides of said housing means, said actuator means being slideably mounted in said housing means and between said first and second switch means, first and second pivot arm means disposed in said housing means and located respectively between said actuator means and said first and second contact arm means, initial movement of said actuator means in a first direction being operative to move said first pivot arm means into engagement with said first contact arm means for moving the same into a closed position and further sliding movement of said actuator means in said first direction being operative to move said second pivot arm means into engagement with said second contact arm means for closing the same.

8. The switch set forth in claim 7 wherein said actuator means includes first and second cam means disposed on the opposite sides thereof, movement of said actuator means in said first direction being operative to sequentially engage said first and second pivot arm means with said first and second cam means, respectively.

9. The switch set forth in claim 8 and including a second terminal means in circuit with one of said stationary contacts, said resistance means comprising a strip of resistive material disposed adjacent said second terminal means and extending in the first direction, and conductive wiper means mounted on said actuator means and engaging said second terminal means and said resistance strip for providing an electrical connection therebetween so that said resistance strip is in circuit between said first and second terminal means, movement of said actuator means in said first direction being operative to move said wiper along said resistance strip and reduce the resistance between said first and second terminal means.

10. The switch set forth in claim 9 wherein each of said contact arm means comprises a resilient member with each being fixed adjacent one end to a different end of said housing means and on the opposites sides thereof, said pivot arm means each being pivotally mounted on said housing about pivot axes adjacent, respectively, to the fixed ends of said resilient members and generally perpendicular to the first direction, each of said pivot arm means being disposed adjacent one of said resilient members and including follower means at its free end disposed between the free end of the adjacent resilient member and the actuator means, movement of said actuator being operative to move said follower means into engagement with the resilient members for closing the same.

11. The switch set forth in claim 10 and including trigger means pivotally mounted on the housing means and coupled to the actuator means, pivotal movement of said trigger means in one direction being operative to move said actuator means in its first direction.

12. The combination of, a variable speed motor, a switch for connecting said motor to a source of electrical energy, said switch including first and second pairs of terminals, one terminal of each pair being adapted to be connected to said source of electrical energy, first and second switch means, each switch means being connected, respectively, in series between the terminals of the first and second pairs of terminals, said motor being connected to the second terminal of one pair of terminals and control means connected between said motor and the second terminal of the other pair of terminals, actuator means operable in a first direction for closing said first and second switch means in sequence so that said first switch means closes prior to said second switch means for delaying the completion of the circuit between the terminals of each pair until said second switch means closes.

13. The switch set forth in claim 12 wherein said first and second switch means each comprise moveable first and second contact arm means and first and second stationary contact means, said actuator means sequentially engaging said contact arm means for closing said switch means in sequence.

14. The switch set forth in claim 13 and including housing means having opposite sides, said first and second switch means being disposed adjacent the opposite sides of said housing means, said actuator means being slideably mounted in said housing means and between said first and second switch means, first and second pivot arm means disposed in said housing means and located respectively between said actuator means and said first and second contact arm means, initial movement of said actuator means in a first direction being operative to move said first pivot arm means into engagement with said first contact arm means for moving the same into a closed position and further sliding movement of said actuator means in said first direction being operative to move said second pivot arm means into engagement with said second contact arm means for closing the same.

15. The switch set forth in claim 14 wherein said actuator means includes first and second cam means disposed on the opposite sides thereof, movement of said actuator means in said first direction being operative to sequentially engage said first and second pivot arm means with said first and second cam means, respectively.

16. The switch set forth in claim 15 and including a second terminal means in circuit with one of said stationary contacts, said resistance means comprising a strip of resistive material disposed adjacent said second terminal means and extending in the first direction, and conductive wiper means mounted on said actuator means and engaging said second terminal means and said resistance strip for providing an electrical connection therebetween so that said resistance strip is in circuit between said first and second terminal means, movement of said actuator means in said first direction being operative to move said wiper along said resistance strip and reduce the resistance between said first and second terminal means.

17. The switch set forth in claim 16 wherein said housing means has opposite ends and each of said contact arm means comprises a resilient member with each resilient member being fixed at one end adjacent a different end of said housing means and on the opposites sides thereof, said first and second pivot arm means each being pivotally mounted on said housing about pivot axes adjacent, respectively, to the fixed ends of the resilient members and generally perpendicular to the first direction, each of said pivot arms being disposed adjacent one of said contact arms and including follower means at its free end disposed between the free end of said resilient members and the actuator means, movement of said actuator being operative to move said follower means into engagement with the resilient members for closing the same.

18. The switch set forth in claim 17 and including trigger means pivotally mounted on the housing means and coupled to the actuator means, pivotal movement of said trigger means in one direction being operative to move said actuator in its first direction.

19. The switch set forth in claim 18 and including an opening formed in said housing, stem means extending from said actuator means and through said opening, said trigger means being coupled to said stem means, and fiberous sealing means disposed in said opening and in surrounding relation to said stem means.

20. A switch includes first and second switch means, actuator means operable in a first direction for sequentially closing said first and second switch means in sequence so that said first switch means closes prior to the closing of said second switch means, biasing means engaging said actuator means for urging said actuator means for movement in the opposite direction for reopening said second and first switch means in sequence so that said second switch means reopens prior to said first switch means, resistance means disposed adjacent one of said switch means, terminal means in circuit with said resistance means, said actuator means electrically coupling said resistance means to one of said switch means and being operative to vary the resistance between said switch means and said terminal means upon movement of said actuator means in said first direction and for increasing the resistance thereof upon return movement in the opposite direction.

21. The combination of, a variable speed motor, a switch for connecting said motor to a source of electrical energy, said switch including first and second pairs of terminals, one terminal of each pair being adapted to be connected to said source of electrical energy, first and second switch means, each switch means being connected, respectively, in circuit between the terminals of the first and second pairs of terminals, said motor being connected to the second terminal of one pair of terminals and control means connected between said motor and the second terminal of the other pair of terminals, actuator means operable in a first direction for closing said first and second switch means in sequence so that said first switch means closes before said second switch means and for completing the circuit between the terminals of each pair, biasing means engaging said actuator means for urging said actuator means for movement in the opposite direction for reopening said second and first switch means in sequence so that said second switch means reopens before said first switch means, resistance means disposed adjacent one of said switch means, additional terminal means in circuit with said resistance means for coupling said resistance means to said control means, said actuator means electrically coupling said resistance means to one of said switch means and being operative to vary the resistance between said switch means and said terminal means upon movement of said actuator means in said first direction and for increasing the resistance thereof upon return movement in the opposite direction whereby the resistance between said switch means and said control means is varied for varying the speed of said motor when said switch means are closed.

* * * * *